J. K. TOLES.
BUILT-UP BOARD OF FIBERIZED CEREAL STRAW.
APPLICATION FILED MAY 22, 1919.
1,369,500. Patented Feb. 22, 1921.
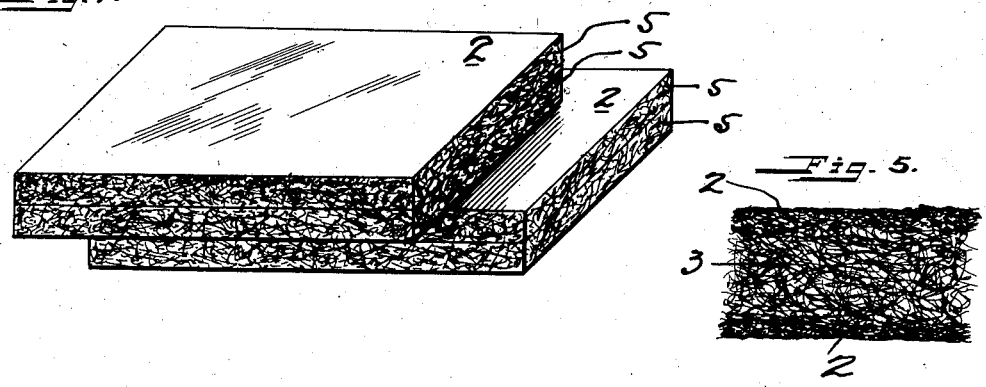
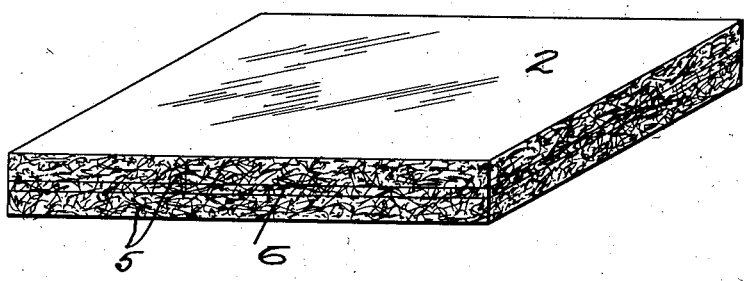
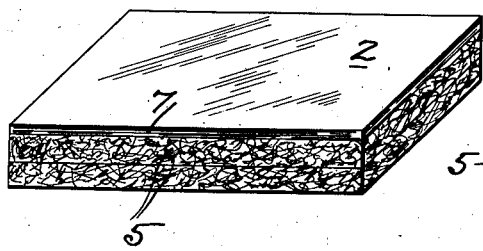
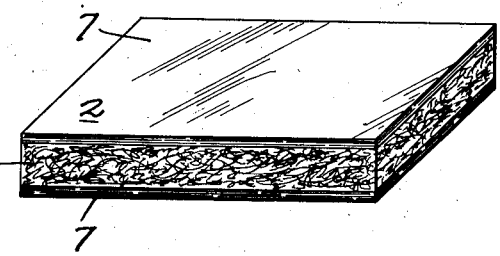
WITNESS
H. A. Sherburne
INVENTOR
JUSTIN KAY TOLES
BY White & Prost
his ATTORNEYS

UNITED STATES PATENT OFFICE.

JUSTIN KAY TOLES, OF SAN FRANCISCO, CALIFORNIA.

BUILT-UP BOARD OF FIBERIZED CEREAL STRAW.

1,369,500. Specification of Letters Patent. Patented Feb. 22, 1921.

Application filed May 22, 1919. Serial No. 298,918.

*To all whom it may concern:*

Be it known that I, JUSTIN KAY TOLES, a citizen of the United States, and a resident of the city and county of San Francisco, State of California, have invented a certain new and useful Built-Up Board of Fiberized Cereal Straw, of which the following is a specification.

The invention relates to a fibrous product, made from cereal straw, such as rice straw.

An object of the invention is to provide a highly efficient heat insulating material made of fiberized cereal straw.

Another object of the invention is to provide heat insulating material shapes.

A further object of the invention is to provide a built-up board or product made of fiberized cereal straw.

The invention possesses other advantageous features, some of which, with the foregoing, will be set forth at length in the following description, where I have outlined in full, those forms of the invention which I have selected for illustration in the drawings accompanying and forming part of the present specification. It is to be understood that I do not limit myself to such forms, since the invention, as expressed in the claims, may be embodied in a plurality of forms.

Referring to said drawings:

Figure 1 is a perspective view of the product of my invention, formed into ship-lap shape.

Fig. 2 is a perspective view of a board of modified construction.

Fig. 3 is a perspective view of a hard-surfaced heat insulating board.

Fig. 4 is a perspective view of a modified form of board.

Fig. 5 is a cross section, on an enlarged scale, through one layer or lamination of the fibrous material.

The product of my invention is made of fiberized cereal straw, preferably rice straw. The straw is first fiberized in any suitable manner, such as by cooking in an alkaline solution, and macerated to loosen the fibers from the gummy material. The fiberized straw is then washed and floated in water or other liquid and a suitable amount of it accumulated in a layer of relatively uniform thickness over a screen or other foraminous surface, which is then lifted from the water with the layer of material. The water content then drains through the screen and the material is dried. When it is first removed from the water, the upper surface of the material is patted or struck lightly with a broad surface, which causes the smaller and finer fibers to move to the upper and lower surfaces of the layer, forming a skin of finer texture than the body of the layer. This is shown in Fig. 5, in which the skins 2 are shown to be formed of the finer fibers, and the body of the material 3 to be formed of the coarser fibers. The skins, being of finer texture and less porous than the body of the layer, act to retard or break up the heat convection currents and arrest the flow of heat.

The product of my invention comprises a built-up board or shape of these layers adhesively secured together by a suitable cement, preferably a waterproof cement. The article thus formed comprises a laminated structure, each lamination 5 comprising a layer with the skins on both surfaces. The laminated structure provides a plurality of skins which break up and oppose the flow of heat, thereby providing greater heat insulating properties than would obtain in a homogeneous board of the same thickness. In Fig. 1, I have shown a board formed of four laminations or layers 5 adhesively secured together, thereby providing four laminations and eight skins which oppose the flow of heat thereby increasing the heat insulation over that which would obtain in a homogeneous board, by the interposition of six skins.

The laminations may be secured together so as to produce any desired shape, such as tongue and groove or the ship-lap shown in Fig. 1. When laminated boards so formed are applied to a wall, the joints between the boards are broken, thereby increasing the heat insulating qualities of the board.

Instead of making all of the laminations of equal thickness, they may be formed of different thicknesses as shown in Fig. 2, in which the central lamination 6 is thinner than the others thereby bringing the skins closer together and obtaining the beneficial effect of a plurality of skins, while keeping the thickness of the laminated board small.

While the fiberized straw is in the wet condition, it may be rolled or pressed, preferably after having been patted to bring the short fibers to the surface, and the pressed fiberized material, when dried, produces a stiff hard finish board, suitable for interior and exterior finish. The material is preferably waterproofed so that it will not absorb moisture and any suitable waterproofing material or solution may be used. I prefer to immerse the wet fiberized material in a waterproofing solution, prior to floating the material, and preferably after the material has been washed to remove the gummy substances. By treating the material in this manner, the entire material is impregnated with the waterproofing solution. The hard finish board 7 may be adhesively attached to one or more laminations 5 of the floated or soft board, thereby producing a hard finish heat and sound insulation board, admirably adapted for building finish purposes. The floated board is light and quite stiff and may be coated on both sides with hard finish boards 7, producing a construction which has many uses in the arts. The laminations also serve to increase the strength of the product, producing a board of greater strength than a homogeneous board of the same thickness.

I claim:

1. An article of manufacture, comprising a plurality of dried unpressed sheets of fiberized cereal straw adhesively secured together in superposed relation.

2. An article of manufacture comprising a laminated structure composed of a plurality of sheets of fiberized cereal straw adhesively secured together, each sheet having a skin which retards heat convection in greater degree than the body of the sheet.

3. An article of manufacture, comprising a laminated structure composed of a plurality of sheets of fiberized cereal straw adhesively secured together, each sheet comprising a dried layer of floated and patted fiberized cereal straw.

4. An article of manufacture, comprising a laminated structure composed of a dried layer of unpressed fiberized cereal straw and an adhesively attached dried layer of pressed fiberized cereal straw.

5. An article of manufacture, comprising a laminated structure composed of a plurality of dried, unpressed, waterproofed layers of fiberized cereal straw adhesively secured together.

6. An article of manufacture, comprising a laminated structure formed of a plurality of sheets of waterproofed fiberized cereal straw adhesively secured together.

7. A laminated structure, comprising a plurality of sheets of floated, waterproofed and dried fiberized cereal straw adhesively secured together with a waterproof adhesive.

In testimony whereof, I have hereunto set my hand at San Francisco, California, this 13th day of May, 1919.

JUSTIN KAY TOLES.

In presence of—
H. G. PROST.